(12) United States Patent
Welnick et al.

(10) Patent No.: US 8,019,340 B2
(45) Date of Patent: Sep. 13, 2011

(54) REDUCED SCANNING WITHIN A UNIFORM PERIOD IN OUT-OF-SERVICE CONDITIONS

(75) Inventors: William E. Welnick, Poway, CA (US); Daniel J. Declerck, Lake Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 799 days.

(21) Appl. No.: 11/683,220

(22) Filed: Mar. 7, 2007

(65) Prior Publication Data

US 2008/0220762 A1    Sep. 11, 2008

(51) Int. Cl.
H04W 4/00    (2009.01)
(52) U.S. Cl. ....... 455/434; 455/421; 455/455; 455/41.2; 455/422.1
(58) Field of Classification Search .................. 455/434, 455/450–452.2, 343.1–343.5, 127.1, 574, 455/509, 420, 421; 370/329, 311
See application file for complete search history.

(56) References Cited

U.S. PATENT DOCUMENTS

| | | | | |
|---|---|---|---|---|
| 5,524,280 A * | 6/1996 | Douthitt et al. | .................. | 455/62 |
| 5,574,773 A * | 11/1996 | Grob et al. | .................... | 455/466 |
| 5,806,006 A * | 9/1998 | Dinkins | ......................... | 455/574 |
| 5,917,854 A * | 6/1999 | Taylor et al. | .................. | 375/222 |
| 5,953,658 A * | 9/1999 | Scott | .......................... | 455/422.1 |
| 5,987,062 A * | 11/1999 | Engwer et al. | ................ | 375/225 |
| 6,049,745 A * | 4/2000 | Douglas et al. | ................ | 701/23 |
| 6,073,035 A * | 6/2000 | Witter | ............................ | 455/574 |
| 6,078,826 A * | 6/2000 | Croft et al. | .................... | 455/574 |
| 6,112,269 A * | 8/2000 | Nordling | ......................... | 710/69 |
| 6,487,264 B1 * | 11/2002 | Alley et al. | ................... | 375/361 |
| 6,671,517 B1 * | 12/2003 | Lin et al. | ........................ | 455/518 |
| 6,714,983 B1 | 3/2004 | Koenck et al. | | |
| 6,865,371 B2 * | 3/2005 | Salonidis et al. | ............. | 455/41.1 |
| 7,215,923 B2 * | 5/2007 | Hillyard | ......................... | 455/41.1 |
| 7,742,447 B2 * | 6/2010 | Joshi et al. | ..................... | 370/329 |
| 2002/0106997 A1 * | 8/2002 | Barber et al. | ................. | 455/343 |
| 2003/0153368 A1 * | 8/2003 | Bussan et al. | ................. | 455/574 |
| 2005/0232196 A1 | 10/2005 | Joshi et al. | | |

OTHER PUBLICATIONS

PCT International Search Report and Written Opinion of the International Searching Authority, Dated Jul. 22, 2008—15 pages.
Neighbor Stability Routing in MANETs—Chen, Lei et al.—IEEE Communications Society/WCNC 2005—pp. 1964-1969.
A Simple Neighbour Discovery Procedure for Bluetooth AD HOC Networks—Ronai, Miklos et al.—GLOBECOM 2003—pp. 1028-1032.
Korean Intellectual Property Office, English translation of "Notice of Preliminary Rejection" for Korean Pat. Appln. No. 10-2009-7018523, Mar. 3, 2011, 3 pages.

* cited by examiner

*Primary Examiner* — Nick Corsaro
*Assistant Examiner* — Babar Sarwar
(74) *Attorney, Agent, or Firm* — Larry G. Brown; Sylvia Chen

(57) ABSTRACT

A method (300) and mobile device (120) for reduced scanning within a uniform period in an out-of-service condition is described herein. In one arrangement, the method can include the steps of detecting (310) the out-of-service condition, during a wake-up interval (410), waking (314) up to scan one or more channels (510, 520, 530, 540) for service and maintaining a constant wake-up time for subsequent wake-up intervals. The method can also include the step of varying (320) the amount of time spent scanning the channels during the subsequent wake-up intervals. As an example, varying the amount of time spent scanning channels can be done by decreasing (322) the amount of time spent scanning for each successive, subsequent wake-up interval.

22 Claims, 3 Drawing Sheets

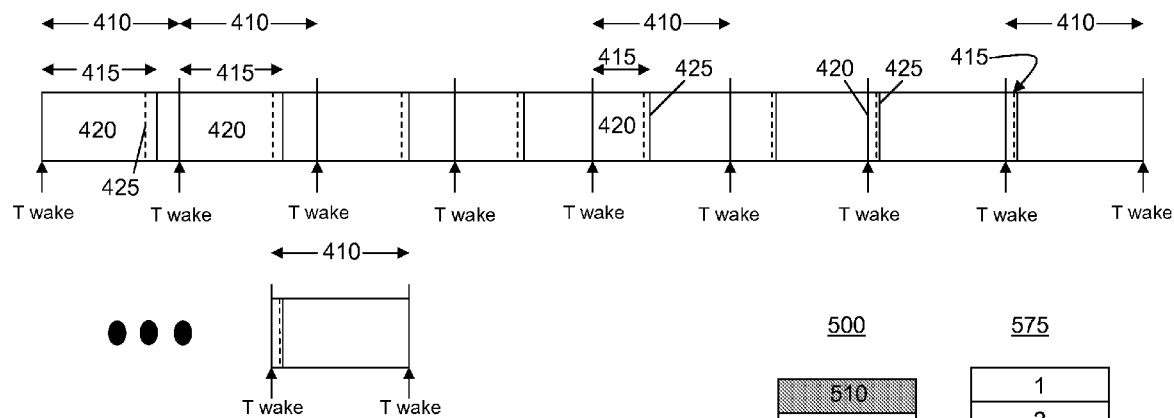
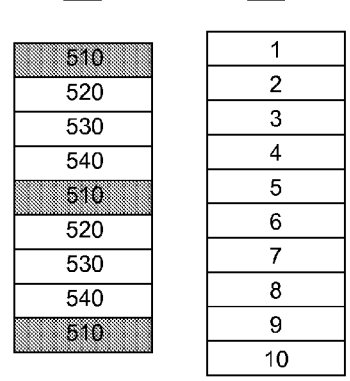
FIG. 4
FIG. 5

REDUCED SCANNING WITHIN A UNIFORM PERIOD IN OUT-OF-SERVICE CONDITIONS

BACKGROUND OF THE INVENTION

1. Field of the Invention

The present invention concerns out-of-service conditions and more particularly, techniques for improving responses to out-of-service conditions.

2. Description of the Related Art

In recent years, the mobile communications industry has exploded in terms of subscriber growth. To meet the increased demand, wireless carriers have built various types of communications networks, which generally provide ample wireless coverage in populated areas. Even so, there are certain locations where coverage may be weak. For example, subscribers may experience poor coverage in enclosed spaces, such as an elevator or a basement. In addition, as a subscriber moves away from a populated area, there is a possibility that the subscriber will lose coverage.

When a mobile unit detects a loss of coverage, i.e., an out-of-service condition, the mobile unit will typically take steps to reacquire a wireless signal. For example, many handsets will scan for the system with which it last communicated and possibly other communication networks, both of which may be stored in a preferred roaming list (PRL). There is a balance that needs to be addressed when designing scanning techniques during an out-of-service condition. One competing interest is the need for the handset to scan frequently for the lost network and other available networks to enable quick re-acquisition of a wireless signal. The other concern is to ensure that the power drain on the handset from the out of service scanning is not too great as to cause a significant degradation in battery life. As a result, handset manufacturers are constantly seeking new techniques for scanning in out-of-service conditions.

SUMMARY OF THE INVENTION

A method and system for reduced scanning within a uniform period in an out-of-service condition is described herein. In one arrangement, the method can include the steps of detecting the out-of-service condition; during a wake-up interval, waking up to scan one or more channels for service; maintaining a constant wake-up time for subsequent wake-up intervals; and varying the amount of time spent scanning the channels during the subsequent wake-up intervals. As an example, varying the amount of time spent scanning channels can include decreasing the amount of time spent scanning for each successive, subsequent wake-up interval. Moreover, the amount of time spent scanning for each successive, subsequent wake-up interval can be decreased until a fixed minimal scanning time is reached.

In another arrangement, the channels can be voice-optimized channels or data-optimized channels. Also, waking up to scan one or more channels for service can include scanning a first scan list containing the voice-optimized channels for a predetermined number of times or scanning a predetermined number of the data-optimized channels, which are part of a second scan list. Decreasing the amount of time spent scanning for each successive, subsequent wake-up interval can include reducing the predetermined number of times the first scan list is scanned for each successive, subsequent wake-up interval or the predetermined number of data-optimized channels of the second scan list that are scanned. As an example, the first scan list and the second scan list can be derived from a preferred roaming list.

In one embodiment, the predetermined number of times the first scan list is scanned can be based on the number of voice-optimized channels in the first scan list. In another embodiment, the time spent scanning during the wake-up interval may take up at most approximately ninety percent of the wake-up interval.

A mobile device that reduces scanning within a uniform period in an out-of-service condition is also described herein. In one arrangement, the mobile device can include a transceiver that receives wireless signals from a communication network and a processor or controller that is coupled to the transceiver. The processor or controller can detect that the transceiver is in the out-of-service condition with the communication network; determine a wake-up interval and a constant wake-up time for the transceiver such that the transceiver will wake up on a substantially uniform basis to scan one or more channels for service; and vary the amount of time that the transceiver will spend scanning the channels for subsequent wake-up intervals. The mobile device can include suitable software and circuitry to carry out any of the steps of the method described above A machine readable storage having stored thereon a computer program having a plurality of code sections executable by a mobile device for causing the mobile device to perform certain steps is described herein. These steps can include detecting an out-of-service condition at the mobile device; determining a wake-up interval for the mobile device; during the wake-up interval, waking up the mobile device to scan one or more channels for service; maintaining a uniform wake-up time for the mobile device for subsequent wake-up intervals; and varying the amount of time that the mobile device spends scanning the channels for service during the subsequent wake-up intervals. The computer program can also cause the mobile device to perform the steps of the method described above.

A method of reduced scanning is also described herein. The method can include the steps of—in response to an out-of-service condition—determining a wake-up interval that designates when a mobile device will wake-up at a uniform rate; when the mobile device wakes up, scanning one or more channels of a scan list for service; and reducing the amount of time that the mobile device spends scanning the scan list for each successive wake-up interval until fixed minimal scanning time is reached, while maintaining the uniform wake-up rate of the mobile device.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 4 illustrates several wake-up listening intervals in accordance with an embodiment of the inventive arrangements; and FIG. 5 illustrates examples of scan lists in accordance with an embodiment of the inventive arrangements.

DETAILED DESCRIPTION OF THE INVENTION

Figure 1:
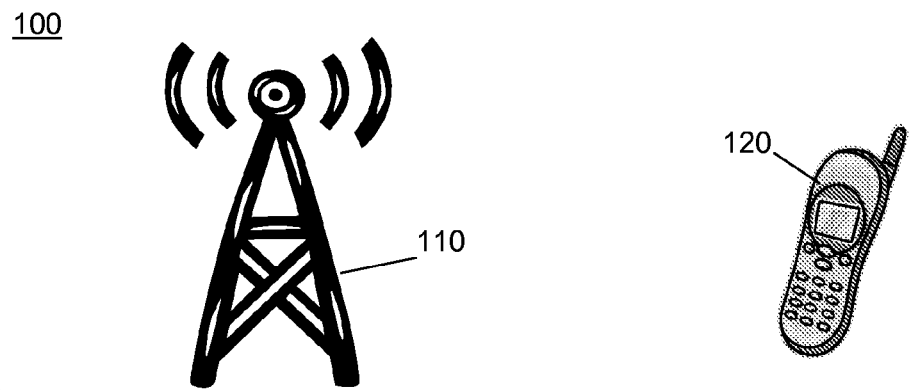
FIG. 1 illustrates a communication network in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "processor" or "controller" can include any component or group of components, including any relevant hardware and/or software, that can carry out the functions described in relation to the inventive arrangements herein.

The term "transceiver" can be any component or group of components that are capable of receiving and/or transmitting communications signals. An "out-of-service condition" can refer to an event where the signal reception of a wireless signal at a mobile unit degrades to the point where the mobile unit can no longer carry on acceptable communications with the entity transmitting the wireless signal. A "wake-up interval" can be a predetermined amount of time during which a mobile unit will wake up to scan for service during at least a portion of the predetermined amount of time.

A "wake-up time" can be a time at which at least a portion of a transceiver will activate to scan for service. The term "channel" can mean any suitable medium through which information may be transmitted. The terms "vary" or "varying" can mean to change or to make or become different. The terms "uniform" or "constant" can mean the same or unchanging throughout. A "preferred roaming list" can mean a file that provides a listing of information relating to the network to which a mobile device is currently subscribed, as well as other alternative networks that the mobile device may use when the currently subscribed network is unavailable. A "voice-optimized channel" can be any channel that is designed for primarily carrying voice traffic, while a "data-optimized channel" can be any channel that is designed primarily for carrying data.

A method and mobile device for reduced scanning within a uniform period in an out-of-service condition is described below. In one arrangement, the method can include the steps of detecting the out-of-service condition, during a wake-up interval, waking up to scan one or more channels for service and maintaining a constant wake-up time for subsequent wake-up intervals. The method can also include the step of varying the amount of time spent scanning the channels during the subsequent wake-up intervals. As an example, varying the amount of time spent scanning channels can be done by decreasing the amount of time spent scanning for each successive, subsequent wake-up interval. Such a method presents a novel technique for scanning for service with minimal impact on battery life.

Referring to FIG. 1, a communication system 100 is shown in which a base station 110 is in wireless communications with a mobile device 120. The mobile device 120 can be any unit capable of at least receiving wireless transmissions, and the base station 110 can be part of any suitable communications network. As an example but without limitation, the base station 110 and the mobile device 120 may conduct communications with one another with code division multiple access (CDMA) as its air interface. Moreover, the base station 110 and the mobile device 120 may exchange any suitable type of information, including both voice and data signals. As mentioned earlier, there is a possibility that the mobile device 120 will enter an out-of-service condition with the base station 110, such as when the mobile device 120 moves outside the range of the base station 110 or enters a structure with poor signal reception.

Figure 2:
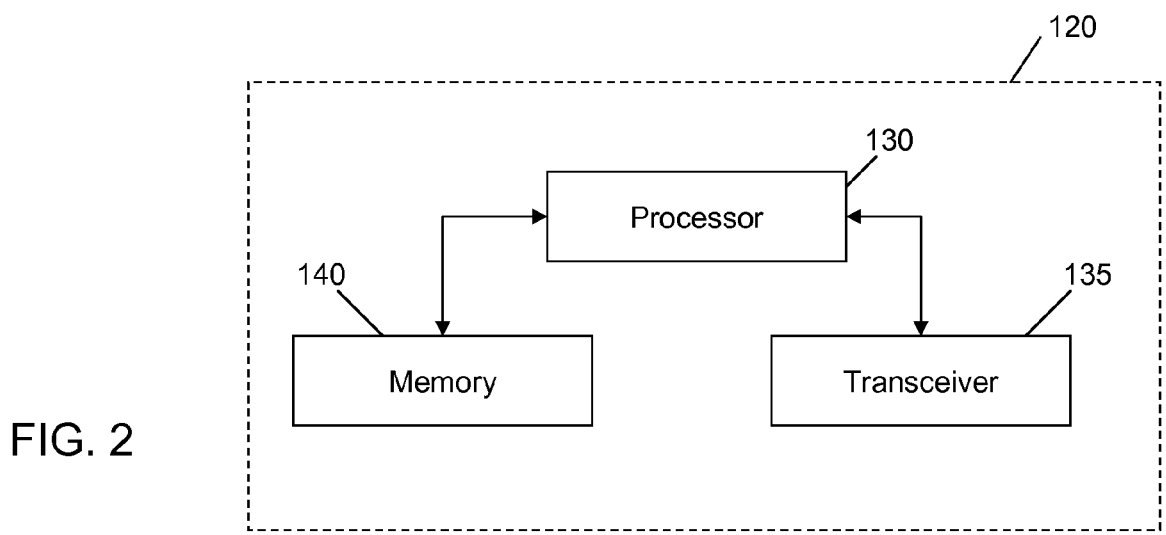
FIG. 2 illustrates a block diagram of a mobile device in accordance with an embodiment of the inventive arrangements.

Referring to FIG. 2, an example of a block diagram of some of the components of the mobile device 120 is shown. In one arrangement, the mobile device 120 can include a processor 130 and a transceiver 135 for receiving signals from the base station 110, which can be coupled to the processor 130. The mobile device 120 can also include a memory 140 for storing any suitable type of data. Although the memory 140 is shown as a separate and discrete component from the processor 130, the memory 140 can actually be part of the processor 130. As an example, the memory 140 can store a PRL, which, as is known in the art, can include information relating to the network that the mobile device 120 subscribes to, as well as information concerning other alternate networks that the device 120 can use when the primary network is not available.

In this arrangement, the processor 130 can detect when the transceiver 135 has entered an out-of-service condition with the base station 110. In response, the processor 130 can instruct the transceiver 135 to scan for the lost network and/or other suitable alternative networks until service is restored. The description below will present an example of how this scanning can be performed.

Figure 3:
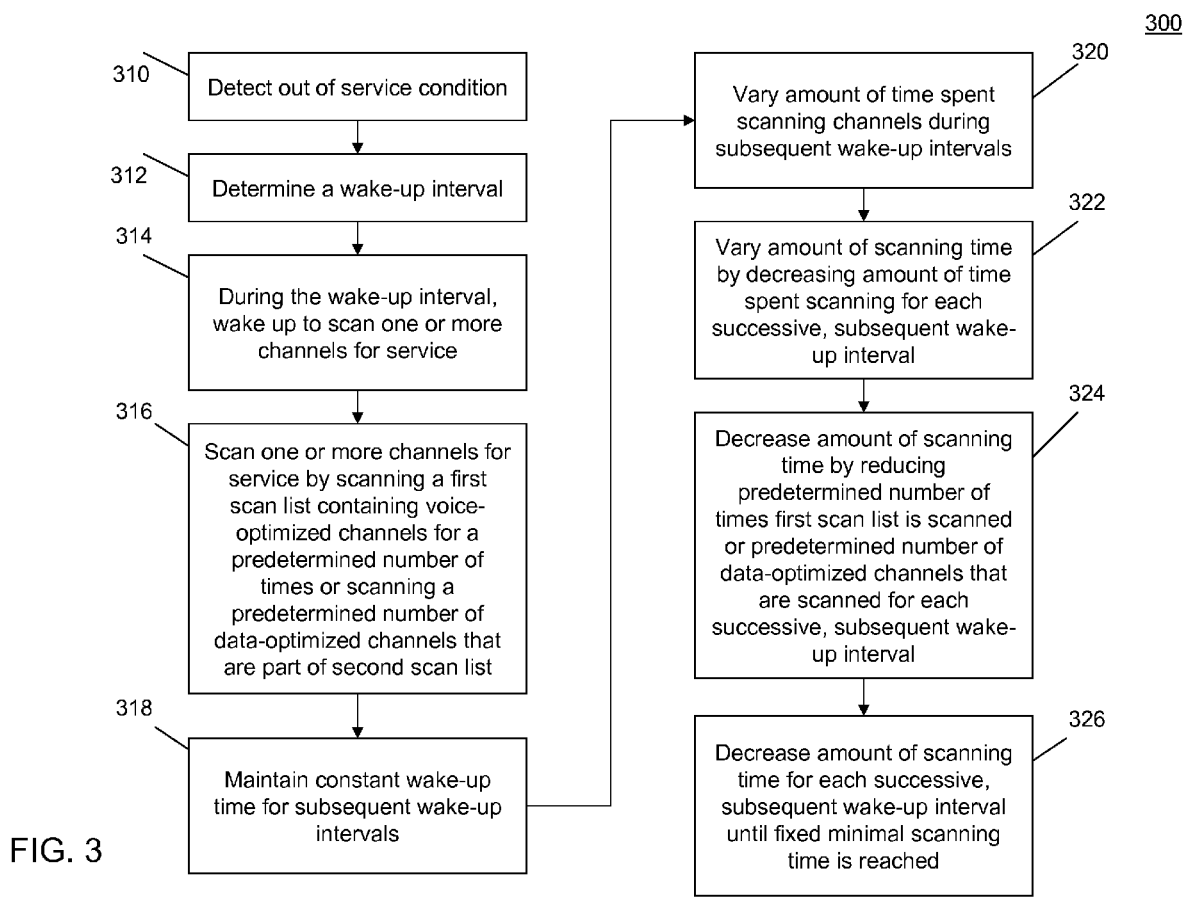
FIG. 3 illustrates a method for reduced scanning within a uniform period in an out of service condition in accordance with an embodiment of the inventive arrangements.

Referring to FIG. 3, a method 300 for reduced scanning within a uniform period in an out-of-service condition is shown. When describing the method 300, reference may be made to FIGS. 1 and 2, although it is understood that the method 300 may be practiced in any other suitable system or device. Reference will also be made to FIGS. 4 and 5, which respectively show an example of several wake-up intervals and examples of scan lists. The steps of the method 300 are not limited to the particular order in which they are presented in FIG. 3. Moreover, the method can also have a greater number of steps or a fewer number of steps than those shown in FIG. 3.

At step 310, an out-of-service condition can be detected, and at step 312, a wake-up interval can be determined. At step 314, during the wake-up interval, the mobile device 120 or some other suitable object may wake up to scan one or more channels for service. One or more channels can be scanned for service by scanning a first scan list containing voice-optimized channels for a predetermined number of times and/or scanning data-optimized channels of a second scan list a predetermined number of times, as shown at step 316.

For example, the mobile device 120 may enter an area where signal reception from the base station 110 is poor. In response, the processor 130 can determine a wake-up interval for the mobile device 120. This wake-up interval can be an amount of time, and in one arrangement, each wake-up interval can be substantially equal in duration. An example of how the wake-up interval is determined will be described below, with reference being made to FIGS. 2, 4 and 5.

As described earlier, the memory 140 can store a PRL. The processor 130 can access the PRL and can generate a scan list, which can be stored in the memory 140, for example. This scan list can include and be defined as one or more channels that the transceiver will selectively scan in an attempt to regain service. In one embodiment, the scan list can include the channel of the network from which service was lost, also referred to as a primary channel, and channels from other alternative networks, which can be referred to as secondary channels. The primary and secondary channels can be voice-optimized channels, and the scan list containing them can be referred to as a first scan list. The processor 130 can set the first scan list such that the primary channel can be scanned more than any one secondary channel, a process that is known in the art.

An example of a scheduled first scan list 500 is shown in FIG. 5, which can include a primary channel 510 (shaded in grey) and secondary channels 520, 530 and 540. As can be seen, the primary channel 510 can be scheduled to be scanned more than the secondary channels for each iteration through the scan list 500. While only three alternative channels are illustrated in this example, it is understood that the scan list 500 is not limited as such, as the scan list 500 can include any suitable number of channels arranged in any suitable order or configuration.

Once the first scan list 500 is set, the processor 130 can determine the amount of time that it will take to scan the first scan list 500. This time may include the amount of time needed to scan each channel plus the number of times that a particular channel will be scanned during the first scan list 500. For example, the primary channel 510 may need to be scanned multiple times based on how the first scan list 500 is arranged. This time will be referred to as $T_{scan}$.

Once $T_{scan}$ is calculated, the processor 130 can determine a scan list multiplier. A scan list multiplier can be the number of times that the first scan list 500 will be scanned for a particular wake-up interval 410 and can include any non-zero whole number or even a fractional number. For example, the scan list multiplier can be first set to a value of seven, which means that the transceiver 130 will scan the first scan list 500 seven times during the wake-up interval 410. As will be explained below, the value for the scan list multiplier can be reduced by one for each successive wake-up interval 410 such that the number of times that the first scan list 500 is scanned for each wake-up interval 410 decreases over time.

The initial setting of the scan list multiplier and its successive reductions can depend on certain criteria. For example, a higher multiplier for the initial wake-up intervals 410 can lead to a greater probability that the mobile device 120 will reacquire service. The selection of this higher multiplier, however, can be tempered by concerns over battery life. Moreover, the balance between the desire to reestablish communications and the concern over current drain can affect how much the multiplier will decrease for subsequent wake-up intervals 410. Other factors, such as the configuration of the mobile device 120 and its performance or intended use and the number of channels in the first scan list 500, may affect the selection of the scan list multiplier.

As noted earlier, this method may be practiced in any suitable communications arrangement. In one particular example, the air interface may be based on CDMA, with the mobile device 120 having the capability of communicating both voice and data with the base station 110. In this example, the mobile device 120 can communicate voice traffic over the CDMA 2000 1xRTT (Radio Transmission Technology) or CDMA 3xRTT standards (respectively referred to as "1x" and "3x") and data over the CDMA 2000 EV-DO (Evolution-Data Optimized) standard (referred to as "EV-DO"). Thus, a second scan list 575 may be generated, where the second scan list 575 may include one or more data-optimized channels. An example of a second scan list 575 containing data-optimized channels 1-10 is shown in FIG. 5, although it is understood that the number of data-optimized channels is not limited to ten.

In view of this description, the $T_{scan}$ may include the amount of time needed to scan both voice-optimized and data-optimized channels in the first scan list 500 and second scan list 575, respectively. For example, $T_{scan}$ can include the amount of time needed to scan a single time all the 1x channels in accordance with their scheduling in the first scan list 500. As another example, $T_{scan}$ may also include the amount of time needed to scan one EV-DO channel in the second scan list 500. In addition, the total amount of scan time for a particular wake-up interval 410 can include $T_{scan}$ multiplied by the scan list multiplier. An example of this time is shown in the first wake-up interval 410 in FIG. 5, with total time portion 415 reflecting the overall scan time for that wake-up interval 410.

The total time portion 415 can include a voice-optimized portion 420 and a data-optimized portion 425. As an example, the voice-optimized portion 420 can include the time required for the first scan list 500 to be scanned one or more times based on the scan list multiplier. As another example, the data-optimized portion 425 can include the amount of time necessary to scan the data-optimized channels of the second scan list 500 one or more times based on the scan list multiplier.

For example, if the scan list multiplier has a value of seven, then the voice-optimized portion 420 can include the time required to scan the first scan list 500 seven times. In a particular example, the arrangement of channels 510-540 of FIG. 5 would be scanned seven times. In one arrangement, the second scan list 575 can be scanned in a slightly different manner. For example, based on the scan list multiplier of seven, seven data-optimized channels would each be scanned one time, such as data-optimized channels 1-7, and the data-optimized portion 425 can include the time necessary to do so.

For example, looking at FIG. 5, a single scan of the first scan list 500 would run in this manner: scan channels 510, 520, 530, 540, 510, 520, 530, 540 and 510. The next iteration through the first scan list 500 would repeat this schedule. Once the first scan list 500 has been scanned seven times, seven data-optimized channels of the second scan list 575 can be scanned, such as data-optimized channels 1-7. This arrangement will result in the 1x channels being scanned multiple times, while only seven individual EV-DO channels may be scanned, as the 1x channels may be given a higher priority in this system.

It must be stressed that the above-description is not limiting. For example, one or more of the data-optimized channels could be scanned multiple times, but no more then seven single scans total would be conducted. Alternatively, the data-optimized channels may be arranged to be scanned in the same manner as the voice-optimized channels. In addition, the data-optimized channels may be given a higher priority than the voice-optimized channels, and as such, the data-optimized channels may be scanned more than the voice-optimized channels in accordance with the discussion above.

Of course, as mentioned earlier, the scanning process is not limited to both voice-optimized and data-optimized channels, as only one type of channel may be scanned. It must also be noted that the first scan list 500 and the second scan list 575 may be assigned different scan list multipliers. In either arrangement, the total time portion 415 for the first wake-up interval 410 can be the sum of the times of the voice-optimized portion 420 and the data-optimized portions 425, which, in view of this example, can be based on a scan list multiplier of seven.

In one arrangement, the total time portion 415, i.e., the time spent scanning during a wake-up interval 410, can take up a less-than-whole percentage of the wake-up interval 410. For example, the total time portion 415 can be capped at approximately ninety percent of the total duration of the wake-up interval 410, with the remaining time being devoted to a sleep time. This process can help improve battery life. With the total time portion 415 and the wake/sleep percentage cap of the wake-up interval 410 known, the overall duration of each of the wake-up intervals 410 can be known. As will be explained below, this duration can remain substantially uniform throughout the out-service condition.

In another arrangement, the first scan list 500, relating to the voice-optimized portion 420, can be scanned first based on the scan list multiplier, and the scanning of the second scan list 575, relating to the data-optimized portion 425, can follow. Of course, the ordering of the scanning is not limited as such, as the second scan list 575 can be scanned first or the two lists 500, 575 can be scanned in an interleaved fashion. Moreover, if desired, only one of the two lists 500, 575 may be scanned, thereby accounting for the entire total time portion 415.

Referring back to FIG. 3, at step 318, a constant wake-up time can be maintained for subsequent wake-up intervals, and at step 320, the amount of time spent scanning channels during subsequent wake-up intervals can be varied. In particular, at step 322, the amount of scanning time can be varied by decreasing the amount of time spent scanning for each successive, subsequent wake-up interval. This scanning time can be decreased by reducing the predetermined number of times that the first scan list is scanned or the predetermined number of data-optimized channels of the second scan list that are scanned, for each successive, subsequent wake-up interval, as shown at step 324. This scanning time can be decreased for each successive, subsequent wake-up interval until a fixed minimal scanning time is reached, as shown at step 326.

For example, referring once again to FIGS. 1-5, once the overall duration of a wake-up interval 410 is known, each subsequent wake-up interval 410 can be set to be substantially the same length of time. In one arrangement, at the beginning of each wake-up interval 410, the transceiver 130 can wake up to scan for service. Because the wake-up intervals 410 are substantially similar in duration, the transceiver 130 can wake up to scan at a substantially uniform rate. As such, the transceiver 130 can maintain a constant wake-up time ($T_{wake}$) throughout the out-of-service condition.

Although the mobile device 130 can wake up at a constant rate to scan for service, the amount of time spent during the scans can vary. For example, focusing on the first wake-up interval 410 of FIG. 4 and for a scan list multiplier of seven, the transceiver 130 can wake up at $T_{wake}$ and scan the first scan list 500 seven times. That is, the transceiver 130 can scan the voice-optimized channels (e.g., 1x channels) arranged in the first scan list 500 seven times during the voice-optimized portion 420. The transceiver 130 may continue on to scan seven data-optimized channels (e.g., EV-DO channels) of the second scan list 575 during the data-optimized portion 425.

Of course, if the transceiver 130 detects a suitable channel at any time during the scanning process, the scanning will discontinue, and the mobile device 120 can camp on the acquired system. If no suitable channel is detected, the mobile device 120 can enter the sleep period of the wake-up interval 410.

At the next wake-up interval 410—in this case, the second wake-up interval 410 of FIG. 4—the mobile device 120 can wake up at $T_{wake}$ and can again scan the first scan list 500 in accordance with the above description. This time, however, the scan list multiplier may be decreased, such as by a value of one. With the scan list multiplier set to six for the second wake-up interval 410, the first scan list 500, which may include voice-optimized, can be scanned six times. Moreover, the number of data-optimized channels in the second scan list 575 to be scanned can be dropped to six. This process will result in a shorter total time portion 415, as compared to the previous (first) wake-up interval 410, and a longer sleep period.

Concerning the scanning of the data-optimized channels, those channels that were not yet scanned can be done so in this iteration. For example, rather than re-scanning data-optimized channels 1-6, channels 8-10 followed by channels 1-3 can be scanned. Of course, if there were more than ten channels in the second scan list 575, those channels can be scanned before wrapping around to the beginning. Again, however, it is important to note that the scanning of the channels in the second scan list 575 is not limited to these examples, as they can be scanned in accordance with any suitable technique.

At the next wake-up interval 410 (third one in FIG. 4), the scan list multiplier can be set to five, which will result in an even shorter total time period 415 and longer sleep period. This reduction in scanning time can continue for subsequent wake-up intervals 410 with a decrease in the scan list multiplier for each successive wake-up interval 410. In this arrangement, more time can be allotted for attempting to acquire a suitable channel at the beginning of the out-of-service condition to help lessen the subscriber's loss of communications, while maintaining the mobile device 120 at a constant wake-up time. Moreover, with the constant wake-up time still in place, less time can be allotted later in the out-of-service condition to lessen the impact on battery life.

The decrease in scanning time can continue until a fixed minimal scanning time is reached. For example, the scan list multiplier can be reduced to a value of one, which means that the first scan list 500 may be scanned only one time, while only one data-optimized channel of the second scan list 575 may be scanned. As can be seen in FIG. 4, this process will create a rather short total time period 415. Once it reaches a value of one, the scan list multiplier may remain at one for the duration of the out-of-service condition or until a time-out period is reached. This example, however, is not limiting, as the scan list multiplier may indeed be changed once it reaches a value of one, if such a change is desired.

As noted earlier, any suitable value for the scan list multiplier may be selected. Moreover, the scan list multiplier does not have to decreased for each successive wake-up interval 410, as it may be held constant (or even increased) for a certain number of wake-up intervals 410. In fact, the scanning process is not limited to being dependent on a scan list multiplier, as other suitable techniques may be implemented to vary the amount of scanning in the wake-up intervals 410, so long as the wake-up time for the mobile device 120 remains substantially constant. For example, the amount of time devoted to scanning in the wake-up intervals, including for both voice-optimized and data-optimized channels, can just be a simple predetermined amount of time, which can be varied (if desired) for subsequent wake-up intervals 410. In this example, it would not be necessary to determine a scan list multiplier.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for reduced scanning within a uniform period in an out-of-service condition, comprising:
    detecting the out-of-service condition;
    during a wake-up interval, waking up to scan one or more channels for service;
    maintaining a constant wake-up time for subsequent wake-up intervals; and
    varying the amount of time spent scanning the channels while in the out-of-service condition during the subsequent wake-up intervals.

2. The method according to claim 1, wherein varying the amount of time spent scanning channels comprises decreasing the amount of time spent scanning for each successive, subsequent wake-up interval.

3. The method according to claim 2, further comprising decreasing the amount of time spent scanning for each successive, subsequent wake-up interval until a fixed minimal scanning time is reached.

4. The method according to claim 2, wherein the channels are voice-optimized channels or data-optimized channels and wherein waking up to scan one or more channels for service comprises scanning a first scan list containing the voice-optimized channels for a predetermined number of times or scanning a predetermined number of the data-optimized channels, which are part of a second scan list.

5. The method according to claim 4, wherein decreasing the amount of time spent scanning for each successive, subsequent wake-up interval comprises reducing the predetermined number of times the first scan list is scanned or the predetermined number of data-optimized channels of the second scan list that are scanned for each successive, subsequent wake-up interval.

6. The method according to claim 5, wherein the first scan list and the second scan list are derived from a preferred roaming list.

7. The method according to claim 4, wherein the predetermined number of times the first scan list is scanned is based on the number of voice-optimized channels in the first scan list.

8. The method according to claim 1, wherein the time spent scanning during the wake-up interval takes up at most approximately ninety percent of the wake-up interval.

9. A mobile device that reduces scanning within a uniform period in an out-of-service condition, comprising:
    a transceiver that receives wireless signals from a communication network; and
    a processor that is coupled to the transceiver, wherein the processor:
    detects that the transceiver is in the out-of-service condition with the communication network;
    determines a wake-up interval and a constant wake-up time for the transceiver such that the transceiver will wake up on a substantially uniform basis to scan one or more channels for service; and
    varies the amount of time that the transceiver will spend scanning the channels while in the out-of-service condition for subsequent wake-up intervals.

10. The mobile device according to claim 9, wherein the processor varies the amount of time that the transceiver will spend scanning by decreasing the amount of time that the transceiver will spend scanning for each successive, subsequent wake-up interval.

11. The mobile device according to claim 10, wherein the processor continues to decrease the amount of time that the transceiver spends scanning for each successive, subsequent interval until a fixed minimal scanning period is reached.

12. The mobile device according to claim 10, further comprising a memory that is coupled to the processor, wherein the memory stores a first scan list containing voice-optimized channels and a second scan list containing data-optimized channels and the transceiver, during the wake-up interval, scans the first scan list a predetermined number of times or the data-optimized channels of the second scan list a predetermined number of times based on a scan list multiplier.

13. The mobile device according to claim 12, wherein the transceiver decreases the amount of time that the transceiver will spend scanning for each successive, subsequent wake-up interval by reducing the scan list multiplier for each successive, subsequent wake-up interval.

14. The mobile device according to claim 13, wherein the first scan list and the second scan list are derived from a preferred roaming list.

15. The mobile device according to claim 14, wherein the scan list multiplier is based on the number of voice-optimized channels in the first scan list.

16. The mobile device according to claim 9, wherein the transceiver spends at most approximately ninety percent of the duration of the wake-up interval scanning for service.

17. A machine readable storage having stored thereon a computer program having a plurality of code sections executable by a mobile device for causing the mobile device to perform the steps of:
    detecting an out-of-service condition at the mobile device;
    determining a wake-up interval for the mobile device;
    during the wake-up interval, waking up the mobile device to scan one or more channels for service;
    maintaining a uniform wake-up time for the mobile device for subsequent wake-up intervals; and
    varying the amount of time that the mobile device spends scanning the channels while in the out-of-service condition during the subsequent wake-up intervals.

18. The machine readable storage according to claim 17, wherein the computer program also causes the mobile device to vary the amount of time that the mobile device spends scanning for service during the subsequent wake-up intervals by reducing the time spent scanning for service during successive, subsequent wake-up intervals.

19. The machine readable storage according to claim 18, wherein the computer program also causes the mobile to perform the step of reducing the time spent scanning for service during successive, subsequent wake-up intervals until a fixed minimal scanning time is reached.

20. The machine readable storage according to claim 18, wherein the computer program also causes the mobile device to scan the channels for service by scanning a scan list stored in the mobile device, wherein the scanning of the scan list is based on a scan list multiplier.

21. The machine readable storage according to claim 20, wherein the computer program also causes the mobile device to reduce the amount of time spent scanning the scan list during successive, subsequent wake-up intervals by reducing the scan list multiplier for each successive, subsequent wake-up interval.

22. A method of reduced scanning, comprising:

in response to an out-of-service condition, determining a wake-up interval that designates when a mobile device will wake-up at a uniform rate;

when the mobile device wakes up, scanning one or more channels of a scan list for service; and reducing the amount of time that the mobile device spends scanning the scan list while in the out-of-service condition for each successive wake-up interval until fixed minimal scanning time is reached, while maintaining the uniform wake-up rate of the mobile device.

* * * * *